(12) United States Patent
Gokhale et al.

(10) Patent No.: US 8,775,823 B2
(45) Date of Patent: Jul. 8, 2014

(54) SYSTEM AND METHOD FOR ENCRYPTING SECONDARY COPIES OF DATA

(75) Inventors: Parag Gokhale, Ocean, NJ (US);
Andrei Erofeev, Marlboro, NJ (US);
Marcus S. Muller, Tinton Falls, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1559 days.

(21) Appl. No.: 11/966,842

(22) Filed: Dec. 28, 2007

(65) Prior Publication Data

US 2010/0031017 A1 Feb. 4, 2010

Related U.S. Application Data

(60) Provisional application No. 60/882,883, filed on Dec. 29, 2006, provisional application No. 61/001,485, filed on Oct. 31, 2007.

(51) Int. Cl.
| | | |
|---|---|---|
| *G06F 12/14* | (2006.01) | |
| *G06F 11/30* | (2006.01) | |
| *G06F 7/04* | (2006.01) | |
| *G06F 17/30* | (2006.01) | |
| *H04N 7/16* | (2011.01) | |
| *H04L 12/40* | (2006.01) | |

(52) U.S. Cl.
CPC .. *H04L 12/40176* (2013.01); *G06F 2221/2107* (2013.01); *G06F 2221/0759* (2013.01); *G06F 2221/07* (2013.01)
USPC ............. 713/189; 713/193; 726/2; 726/26

(58) Field of Classification Search
CPC .............. G06F 2221/07; G06F 2221/0759; G06F 2221/2107; G06F 2221/21; H04L 12/40176
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

U.S. Appl. No. 12/058,511, filed Mar. 28, 2008, Prahlad et al.

(Continued)

*Primary Examiner* — Azizul Choudhury
(74) *Attorney, Agent, or Firm* — Knobbe, Martens, Olson and Bear, LLP

(57) ABSTRACT

A system and method for encrypting secondary copies of data is described. In some examples, the system encrypts a secondary copy of data after the secondary copy is created. In some examples, the system looks to information about a data storage system, and determines when and where to encrypt data based on the information.

4 Claims, 7 Drawing Sheets

(56) References Cited

U.S. PATENT DOCUMENTS

| | | |
|---|---|---|
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,966,448 A * | 10/1999 | Namba et al. .................. 380/33 |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,496,949 B1 | 12/2002 | Kanevsky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,959,327 B1 | 10/2005 | Vogl et al. |
| 7,110,546 B2 * | 9/2006 | Staring .................. 380/260 |
| 7,266,200 B2 * | 9/2007 | Lambert .................. 380/263 |
| 7,315,923 B2 | 1/2008 | Retnamma et al. |
| 7,496,766 B2 | 2/2009 | Kitamura |
| 7,506,102 B2 | 3/2009 | Lev-Ran et al. |
| 7,627,776 B2 | 12/2009 | Petruzzo |
| 7,783,895 B2 | 8/2010 | Hori et al. |
| 8,009,833 B2 * | 8/2011 | Uchikawa .................. 380/255 |
| 2004/0210539 A1 * | 10/2004 | Ikeda et al. .................. 705/80 |
| 2005/0091655 A1 | 4/2005 | Probert et al. |
| 2005/0108526 A1 | 5/2005 | Robertson |
| 2006/0120520 A1 | 6/2006 | Suzuki et al. |
| 2006/0242296 A1 | 10/2006 | Woolard et al. |
| 2007/0057958 A1 | 3/2007 | Bucher et al. |
| 2008/0005380 A1 | 1/2008 | Kawasaki et al. |
| 2008/0091747 A1 | 4/2008 | Prahlad et al. |
| 2008/0320319 A1 | 12/2008 | Muller et al. |
| 2009/0222907 A1 | 9/2009 | Guichard |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO 95/013580 | 5/1995 |
| WO | WO99/12098 | 3/1999 |
| WO | WO-99/12098 | 3/1999 |

OTHER PUBLICATIONS

U.S. Appl. No. 12/058,518, filed Mar. 28, 2008, Prahlad et al.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera, et al. "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, Jason, "The Optical File Cabinet: A Random-Access File System for Write-On Optical Disks," IEEE Computer, vol. 21, No. 6, pp. 11-22 (1988) (see in particular figure 5 in p. 15 and recitation in claim 5).

Jander, M., "Launching Storage-Area Net," Data Communications, US, MCGraw-Hill, NY, vol. 27, No, 4 (Mar. 21, 1998), pp. 64-72.

Rosenblum, et al. "The Design and Implementation of a Log-Structure File System," Operating Systems Review SIGOPS, vol. 25, No. 5, New York, US, pp. 1-15 (May 1991).

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 12/060,026, filed Mar. 31, 2008, Muller et al.

Armstead et al., "Implementation of a Campus-Wide Distributed Mass Storage Service: The Dream vs. Reality," IEEE, 1995, pp. 190-199.

* cited by examiner

SYSTEM AND METHOD FOR ENCRYPTING SECONDARY COPIES OF DATA

CROSS REFERENCE TO RELATED APPLICATIONS

This application claims priority to U.S. Provisional Patent Application No. 60/882,883, filed on Dec. 29, 2006, entitled SYSTEM AND METHOD FOR ENCRYPTING DATA TO BE ARCHIVED, and to U.S. Provisional Patent Application No. 61/001,485, filed on Oct. 31, 2007, entitled SYSTEM AND METHOD FOR ENCRYPTING SECONDARY COPIES OF DATA, which are incorporated by reference in their entirety.

This application is related to U.S. patent application Ser. No. 10/990,284, filed Nov. 15, 2004, entitled SYSTEM AND METHOD FOR PROVIDING ENCRYPTION IN PIPELINED STORAGE OPERATIONS IN A STORAGE NETWORK, U.S. patent application Ser. No. 11/694,748, filed on Mar. 30, 2007, entitled SYSTEMS AND METHODS OF MEDIA MANAGEMENT, SUCH AS MANAGEMENT OF MEDIA TO AND FROM A MEDIA STORAGE LIBRARY, U.S. patent application Ser. No. 11/564,119, filed on Nov. 28, 2006, entitled SYSTEMS AND METHODS FOR CLASSIFYING AND TRANSFERRING INFORMATION IN A STORAGE NETWORK, and U.S. patent application Ser. No. 11/950,376, filed on Dec. 4, 2007, entitled SYSTEMS AND METHODS FOR CREATING COPIES OF DATA, SUCH AS ARCHIVE COPIES, which are incorporated by reference in their entirety.

BACKGROUND

In a typical corporate environment, personal computers are connected to local area networks (LAN) or wide area networks (WAN) to access applications and files. In these networks, electronic data is stored on servers or on stand-alone devices that are accessible via the network. Examples of network storage devices include tape drives, optical libraries, redundant arrays of inexpensive disks (RAID), CD-ROM jukeboxes, and other devices.

In addition to maintaining data on LAN or WAN application servers, these environments may include data storage systems that create an initial, or primary copy of the data, transfer data, or copies of data, to long-term storage devices (e.g. to create a secondary copy of the data, such as a backup copy, an archive copy, and so on).

Factors considered when implementing such data storage systems include the ability to create secondary copies of data that are recoverable and secure. For example, a corporation may want to access secondary copies of data when resources fail, in order to perform restore operations. However, corporations also want to protect the copies of data, often stored in off-site locations, from inappropriate or unauthorized access. Accordingly, many data protection methodologies exist (such as encryption) that assist in creating accessible yet secure secondary copies of data for corporations and other entities. However, current data storage systems are often ineffective when attempting to employ such data protection methods.

These and other problems exist with respect to encrypting secondary copies of data during data storage operations.

DETAILED DESCRIPTION

Figure 1A:
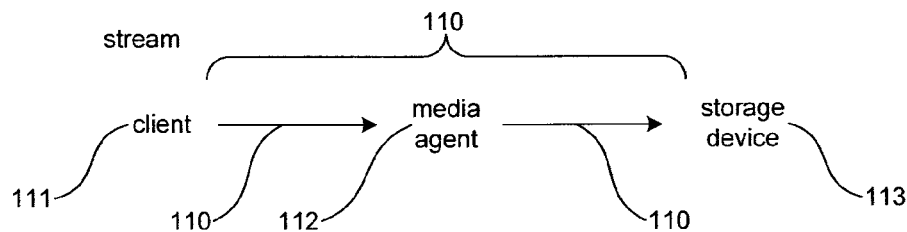
FIG. 1A is a block diagram illustrating an example of components used in data storage operations.

Examples of the technology are directed to systems and methods that improve the speed and efficiency of encrypting data during data storage operations. As mentioned herein, corporations and other entities often want to store data (such as a corporation's proprietary data) as securely as possible, given time and financial constraints imposed upon their storage systems. Using various encryption systems and techniques, a data storage system is able to create copies of data that are secure and able to prevent (in most cases) unauthorized access to the data. However, in some cases, encrypting data is a processor-intensive operation that often negatively impacts computing system and network performance when encrypting data.

Therefore, in some examples, the system encrypts a secondary copy of data after the secondary copy is created and before the secondary copy is transferred to an off-site location. For example, the system may create a first secondary copy of the data that is not encrypted, and create a second copy from the first copy that is encrypted after creation. In this example, the system creates the first copy without adding additional time constraints and/or resource consuming processing to network resources, and creates a subsequent and/or additional encrypted second copy at a more convenient or advantageous time using resources (e.g., additional servers, clients, or storage agents) outside of the network.

In some cases, the system selectively encrypts a portion of a copy of data, based on a number of factors. For example, the system may only encrypt data to be stored off-site from the system, or may only encrypt certain types of data. That is, the system may not encrypt temporary copies of data made by incremental daily storage operations, as they may ultimately be discarded by the system. These storage operations made include backup operations, performing snapshots, continuous data protection processes, archiving operations, and so on. The system may be able to reduce the processing of creating copies of data by using resource and data storage operation information to determine what data should be encrypted, and encrypting only that data. The system may have pre-determined policies defining what data to encrypt, or may dynamically determine what data to encrypt during a data storage operation.

Additionally, in some cases, the system dynamically determines when to encrypt data, and based on certain factors (such as system performance, time constraints, data storage operation performance, resource usage, and so on), may cause some or all encryption processes to occur when and/or after a copy is made.

Additionally, in some cases, the system receives previously stored and/or encrypted data (such as secondary copies of previously created data stores) and re-encrypts the previously stored data in order to update their encryption schemes.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1A, a block diagram illustrating components used in a data stream 110 that create, migrates, and/or transfers data from a client to a storage device via a media agent, is shown. The stream 110 may include or be associated with a client 111, such as a sub-client data agent that manages and transfers data from a portion of a file system, a media agent 112, and a secondary storage device 113. For example, in storage operations, the system may store, receive and/or prepare data to be stored, copied or backed up at a server or client 111. The system may then may then refer to storage policies, schedule policies, and/retention policies (and other policies) and transfer the data to be stored to media agent 112, which then reviews the policies in order to choose a secondary storage device 113 for storage of the data. The media agent 112 may then encrypt the data. The secondary storage devices 113 may be magnetic tapes, optical disks, USB and other solid state devices, other similar media, and so on. In some cases, there may be a storage manager (not shown) or other management components that communicate with clients and media agents to provide instructions regarding storage operations. Further details regarding the structure and functionality of the client 111, media agent 112, storage device 113 and storage management components may be found in U.S. patent application Ser. No. 11/950,376, filed on Dec. 4, 2007, entitled SYSTEMS AND METHODS FOR CREATING COPIES OF DATA, SUCH AS ARCHIVE COPIES, which is incorporated by reference in its entirety.

Figure 1B:
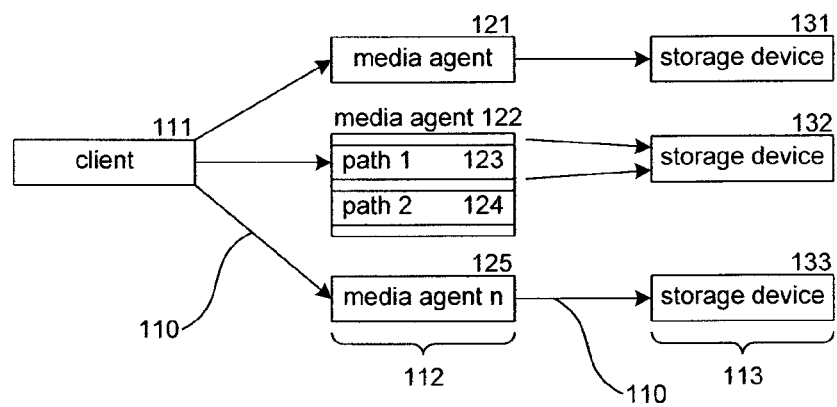
FIG. 1B is a block diagram illustrating an alternative example of components used in data storage operations.

Referring to FIG. 1B, a block diagram illustrating components of multiple selectable data streams is shown. Client 111 and any one of multiple media agents 112 may establish a stream 110. For example, one stream may contain a client 111, a media agent 121, and a storage device 131, while a second stream may use a media agent 125, a storage device 133, and the same client 111. Additionally, media agents may contain additional subpaths 123, 124 that may increase the number of possible streams for client 111. Examples of subpaths 123, 124 include host bus adapter (HBA) cards, Fibre Channel cards, SCSI cards, wireless connections, and so on. Thus, the system is able to stream data from client 111 to multiple secondary storage devices 113 via multiple media agents 112 using multiple streams.

Figure 1C:
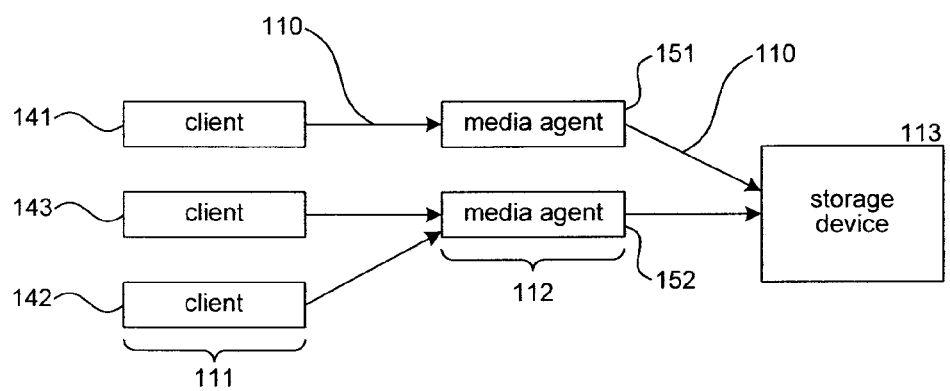
FIG. 1C is a block diagram illustrating an alternative example of components used in data storage operations.

Referring to FIG. 1C, a block diagram illustrating components of alternative multiple selectable data streams is shown. In this example, the system may transfer data from multiple media agents 151, 152 to the same storage device 113. For example, one stream may be from client 141, to media agent 151, to secondary storage device 113, and a second stream may be from client 142, to media agent 152, to secondary storage device 113. Additionally, two clients may share a media agent, such as clients 142 and 143 with media agent 112. Thus, the system is able to copy data to one secondary storage device 113 using multiple streams 110.

Additionally, the system may stream may be from one client to two media agents and to one storage device. Of course, the system may employ other configurations of stream components not shown in the Figures.

Figure 1D:
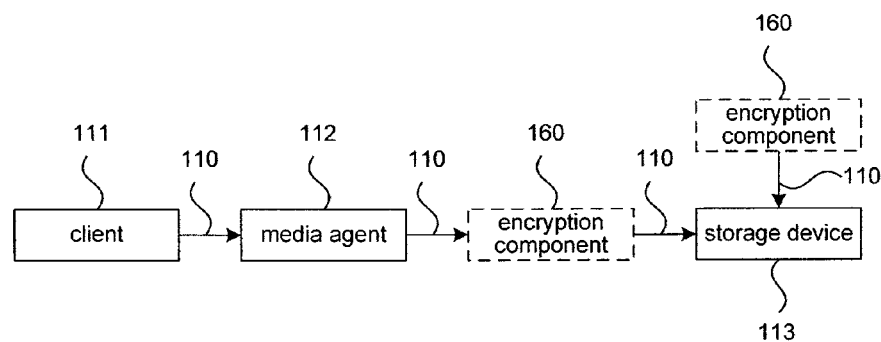
FIG. 1D is a block diagram illustrating an alternative example of components used in data storage and encryption operations.

Referring to FIG. 1D, a block diagram illustrating components of a data stream used in creating and storing an encrypted copy of data is shown. The stream 110 may include a client 111, a media agent 112, an encryption component 160, and a secondary storage device 113. The encryption component may perform some or all of the processes described herein, including encrypting data received from the media agent 112, encrypting data received by the storage device 113, re-encrypting encrypted data, and so on.

The system may perform concurrent or subsequent processes or operations such as compression, network transfer, storage, etc., to the data or to a copy of the data. Other components (not shown) may split these processes into tasks that perform specific functions (e.g., compression). Alternatively, a monolithic program may perform some or all operations, or the system may use threads and thread-signaling protocols. For example, the system may employ some or all aspects of a pipeline storage system in which one or more data streams containing data to be stored are written into data chunks, and the system encrypts the data during the transfer of data by communication with a buffer of memory containing data to be transferred to secondary storage media.

The system may employ a variety of security measures in protecting data within copies and in implementing the security measure onto the data copies. The system may scramble data, encrypt data, or otherwise secure the data. For example, the system may use a key-based encryption scheme that stores a key (which may have additional security) on a network server and uses the key to decrypt any encrypted copies of data.

Details with respect to pipeline storage systems and various encryption schemes may be found in commonly-assigned U.S. patent application Ser. No. 10/990,284, filed Nov. 15, 2004, entitled SYSTEM AND METHOD FOR PROVIDING ENCRYPTION IN PIPELINED STORAGE OPERATIONS IN A STORAGE NETWORK, which is incorporated by reference in its entirety.

Figure 1E:
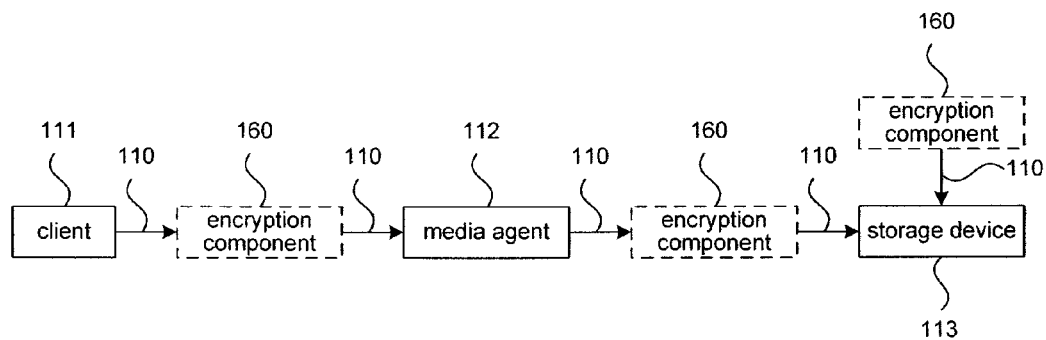
FIG. 1E is a block diagram illustrating an alternative example of components used in data storage and encryption operations.

Referring to FIG. 1E, a block diagram illustrating components of an alternative data stream used in creating and storing an encrypted copy of data is shown. The stream 110 may include a client 111, a media agent 112, one or more encryption components 160, and a secondary storage device 113. The encryption component 160 may encrypt data received from the client 111 (such as when creating a secondary copy), from a media agent 112 (such as after creating of a secondary copy), or both. The encryption component 160 may receives instructions from other resources within the data storage system, such as a storage management server, and encrypt or not encrypt based on the received instructions. Further details with respect to other resources and their interaction with the encryption component 160 will be described herein.

Figure 2:
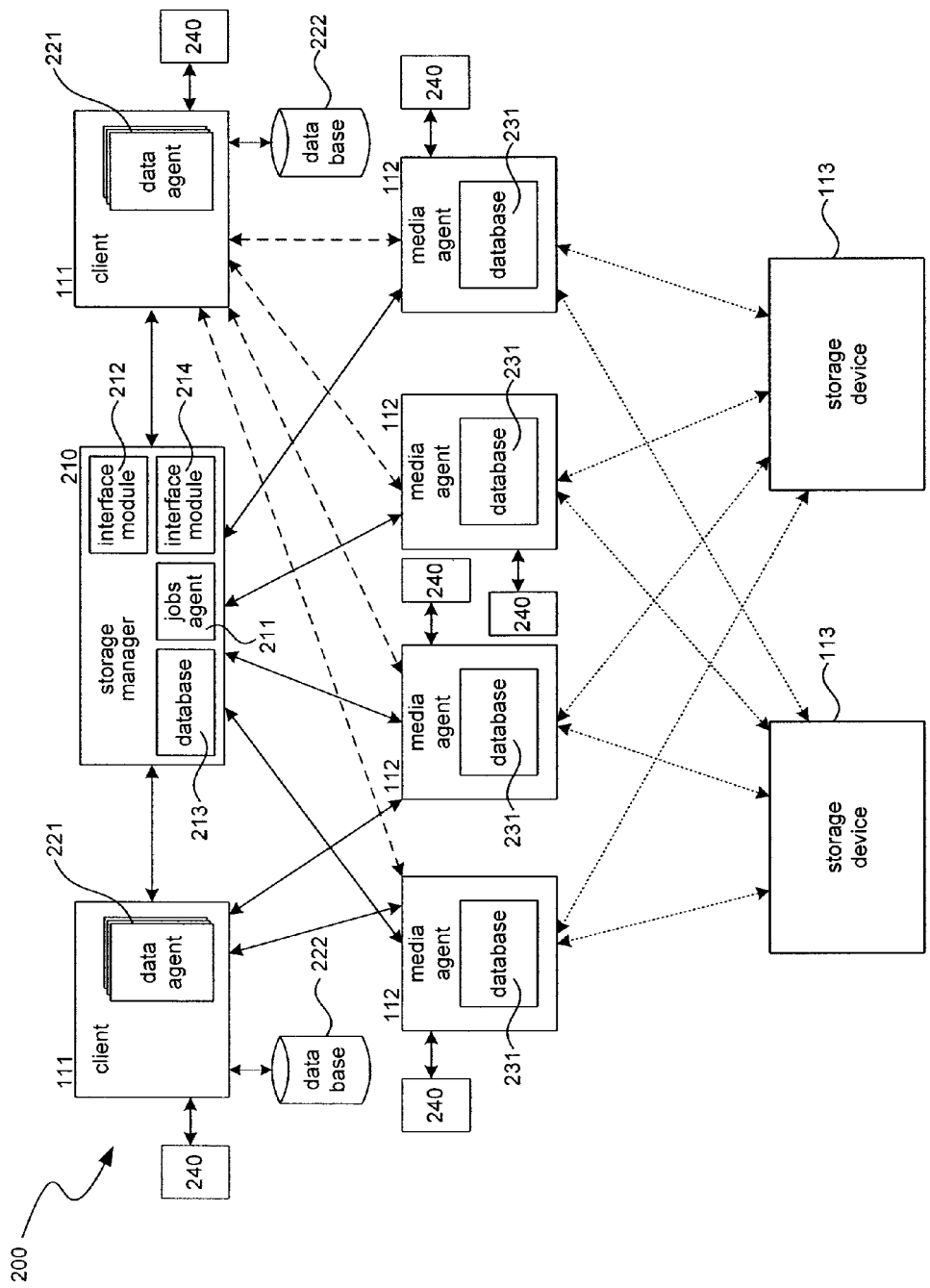
FIG. 2 is a block diagram illustrating an example of a data storage system.

Referring to FIG. 2, a block diagram illustrating an example of a data storage system 200 is shown. Data storage systems may contain some or all of the following components, depending on the needs of the system.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example. Additionally, either clients 111 or media agents 112 (or both) may include encryption components 240 used to encrypt copies of data either when the system creates copies of data or after the system creates the copy of data.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. The data copies may include snapshot copies, backup copies, HSM copies, archive copies, and so on.

The data storage system may create a secondary copy of data from a production copy or "live" version of the data created and used by a software application. The secondary copy typically remains in the native format of that application. The system may maintain the secondary copy of data in a local memory or other high-speed storage device, allowing for relatively fast access to the data, when necessary. Systems use secondary copy data for short term retention (e.g., several hours or days) before some or all of the data is stored as one or more additional secondary copies, such as archive copies and other longer term storage copies. For example, systems may use a secondary copy to prevent loss of data in the event a problem occurred with the data stored as a primary copy in primary storage.

The data storage system may create a secondary copy for a selected subset of data within a primary copy (including a subset that contains all the data). The secondary copy may include point-in-time data, and may contain data marked for long-term retention (e.g., weeks, months or years depending on desired retention). Data storage systems may index secondary copies, allowing users, in some cases, to browse, search for, and possibly restore the data at future point in time.

One example of a secondary copy is a backup copy. A backup copy is typically a point-in-time copy of the primary copy data stored in a format specific to the data storage system and may or may not be specific to the native application. For example, a data storage system may store a backup copy in a backup format that is optimized for data compression and efficient long-term storage. A backup copy may have a relatively long retention period. Data storage systems may locate a backup copy on media with slower retrieval times than other types of secondary copies and/or media. In some cases, data storage systems may transfer media containing a backup copy to an off-site storage location.

Another example of a secondary copy is an archive copy. The data storage system may create an archive copy of certain data to retain the data for very long periods of time (e.g., many years). Similar to a backup copy, a data storage system may store an archive copy in a format specific to the data storage system and not specific to the native application that created the data. An archive copy may be created and maintained for extended periods in order to meet compliance regulations or for other permanent storage applications. Examples of other types of copies include snapshot copies, incremental copies, mirrors, continuous data protection copies, and so on.

The resources shown in FIG. 2 and described herein may also perform storage management functions that may communicate information to higher level components, such as global management resources and may perform other processes to the data copies, such as encryption of the data in a secondary copy.

For example, the media agents 112, the storage devices 113, or discrete component may perform processes similar to those in encryption component 160. The system may selectively employ one or more resources in encrypting data, including secondary copies of data to be stored within storage devices 113. Storage manager 210 may review system operations, received instructions, performance metrics, historical information, or other information in determining at what time and at what location to encrypt data in a secondary copy.

In some examples, the system performs storage operations based on storage policies, as mentioned above. For example, a storage policy includes a set of preferences or other criteria to be considered during storage operations. The storage policy may determine or define a storage location and/or set of preferences about how and when the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
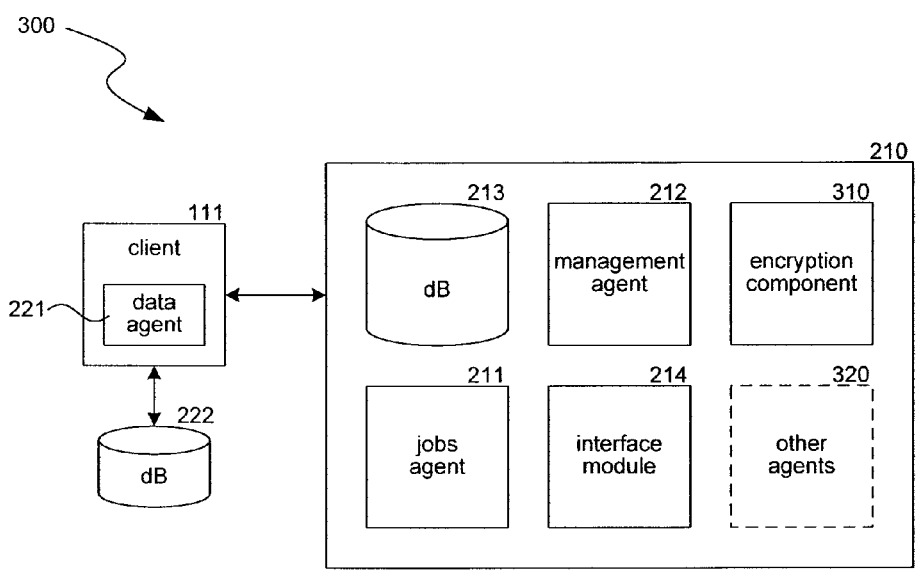
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to secondary storage. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs). Storage manager 210 may also include an encryption, module or component 310 that interacts with the other agents and components to determine at what time to encrypt a copy of data, at what location in the system to encrypt a copy of data, what encryptions schemes and/or techniques to implement, and so on. Furthermore, the storage manager 210 may include other agents 320, such as re-encryption agents, monitoring agents, and so on.

In addition to the resources shown in the FIGS. 1 through 3, the data storage system may be associated with a media library that houses media components, such as magnetic tapes, optical disks, USB devices, solid state devices, and so on. The system may perform some or all data transfers to media contained within the media library, including data writes, data restores, and so on. Additionally, the system may perform some or all of the encryption processes described herein at the media library, or at devices in communication with the media library. For example, the system may import a media component to the library, determine that the media component contains a previous version of an encryption scheme, decrypt the media component, retrieve the data from the media component, encrypt the previously stored data and the newly stored data with an updated scheme, and store the retrieved data and the additional data on the media component under the updated encryption scheme. Further details with respect to the media library and library processes are described in commonly-assigned U.S. patent application Ser. No. 11/694,748, filed on Mar. 30, 2007, entitled SYSTEMS AND METHODS OF MEDIA MANAGEMENT, SUCH AS MANAGEMENT OF MEDIA TO AND FROM A MEDIA STORAGE LIBRARY, which is hereby incorporated by reference in its entirety.

Encryption of Secondary Copies of Data

Figure 4:
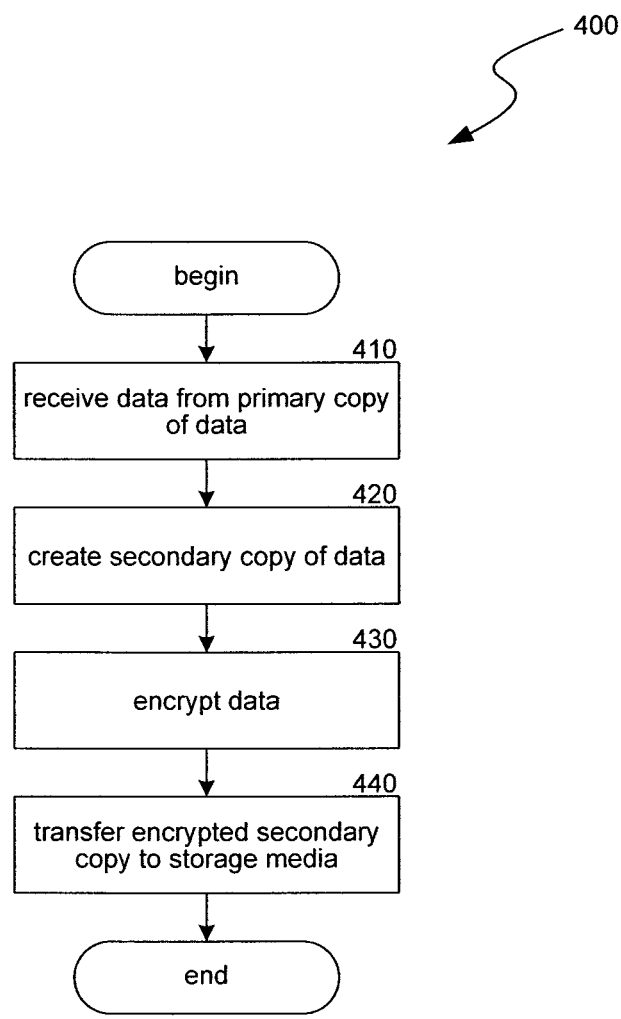
FIG. 4 is a flow diagram illustrating a routine for encrypting data.

FIG. 4 illustrates a routine 400 for encrypting data. As described herein, typical data storage systems encrypt copies of data within the network of computing resources, without considering the performance of the network or data storage operations. For example, these data storage systems store data at specified time periods (such as nightly) creating an encrypted copy using system resources, hindering performance and system data storage operations. Therefore, in some cases it may be advantageous to encrypt data after creating a secondary copy of a data set (using resources other than the resources used to create the copies).

As shown in FIG. 4, in step 410 the system receives data to be stored in secondary storage. The data may be from an original data set, such a primary copy of the original data set. For example, an application server in a computer network stores data during the course of a work day, such as data that corresponds to files created or edited by users connected to the network. The system may employ a copy module or storage manager to analyze a memory of the application server and determine incremental changes made to an original data set, and indicate these incremental changes. In some case, in conjunction with a storage manager 210, a media agent 112, at the end of each work day (and within a storage window of time, to be described herein) transfers or stores the newly created or changed data to a storage device, creating a copy of the data stored within the network.

In step 420, routine 400 creates a copy of the data from the primary copy. For example, the system looks to a queue of jobs within jobs agent 211 and selects one or more jobs (containing data to be copied) for the secondary copy. The system may also review a storage policy to determine where to store the secondary copy (that is, the system uses the storage policy to identify an appropriate storage device). The system may also employ processes described herein when creating secondary copies.

In step 430, routine 400 encrypts the data contained in the secondary copy created in step 420. The system may perform some or all of the encryption using resources not included within the data production network. For example, the system may transfer the secondary copy to a server outside of the network, such as a non-production server, and encrypt the secondary copy at the server not within the data production network. The system may also transfer some of the data to be encrypted to the non-production server, and split the processing used in encrypting the secondary copy with the production server in cases where the production server still performs some encryption (for example, with data related to sensitive or high priority information). The system may use information related to running data storage operations, information related to the availability and/or performance of network resources, information related to the time period reserved for data storage operations, and so on when determining where to encrypt the data within the secondary copy. For example, the system may receive information from the storage manager 210 indicating the network resources are running near full capacity, and instructing the system to push all encryption processes to a non-production server.

In step 440, routine 400 transfers the encrypted secondary copy to storage media, such as a magnetic tape. The system may look to a storage policy to determine where to store the encrypted secondary copy. The system may subsequently export or send the storage media to an off-site location, or to other locations within the network.

As described herein, in some cases the system creates a secondary copy from the primary copy of the application server data, and later encrypts the secondary copy. For example, the system may identify changes in memory and store a copy of these changes. The system may then create a secondary copy of the changes, and encrypt the secondary copy. Thus, the system may further reduce processing demands to the network by creating a secondary copy of changes to a data set (and not of the data set), and encrypting the secondary copy of the changes to the data set.

Of course, it is possible that the system may create subsequent copies of a data set, such as additional secondary copies (for example, one backup copy and one archive copy, two archive copies, and so on). The system may selectively encrypt some or all of the created additional secondary copies, and may select to create the copies before encryption, or may alternatively choose to copy an encrypted secondary copy.

In some cases, the system may receive information or instructions from data storage managers within the network about when to encrypt, where to encrypt, what data to encrypt, and so on.

For example, the systems used to perform data storage operations of electronic data are complex systems, often copying and storing many terabytes of data during a storage window. These systems are required to store large amounts of data (e.g. all of a company's data files) during a time period known as a "storage window" or "backup window." The storage window defines a duration and actual time period when the system may perform storage operations. For example, a storage window may be for twelve hours, between 6 PM and 6 AM (that is, twelve non-business hours). For many corporations, storage windows are rigid and unable to be modified. Therefore, when data storage systems attempt to store increasing data loads or receive increased processing resource demands, they may need to do so without increasing the time in which they operate. The system may review the timing of data storage operations, and move encryption processes off of certain data storage operation resources when the review indicates that the encryption would cause the system to not meet the timing needs associated with a storage window. Many systems perform daily storage operations, which may add further reliance on completing storage operations during allotted storage windows. Thus, moving the encryption processes off of some or all of the data storage resources may alleviate many problems associated with the timing and duration of data storage operations.

Figure 5:
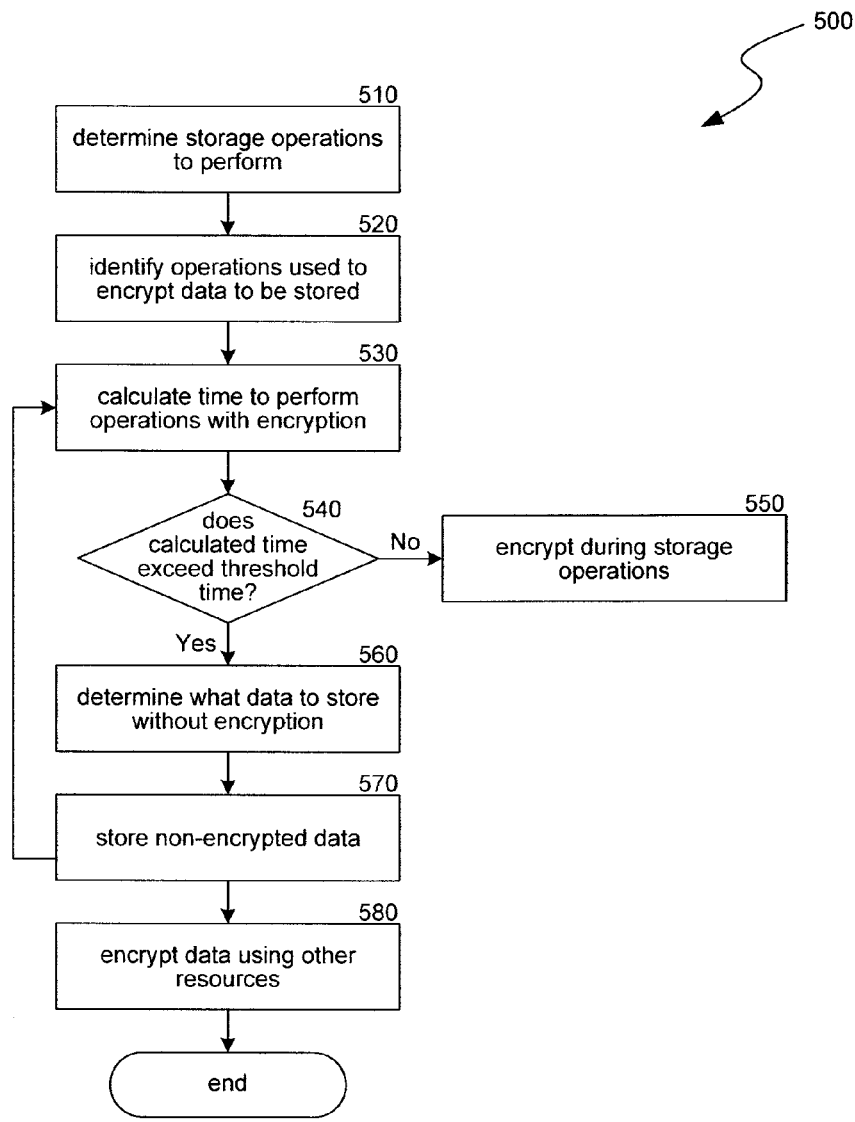
FIG. 5 is a flow diagram illustrating an alternative routine for encrypting data.

FIG. 5 illustrates a routine 500 for dynamically determining when to encrypt data during storage operations. In step 510, the system receives data to be stored as a secondary copy, and determines what data storage operations to perform. In step 520, the system identifies operation used to encrypt the data to be stored. In step 530, the system calculates and/or estimates the time to perform the data storage operations with the encryption. In step 540, the system determines if the calculated time exceeds a threshold, such as a deadline for performing the storage operations. If the calculated time does not exceed the threshold, routine 500 proceeds to step 550 and the system encrypts the data during the data storage operations. If the calculated time does exceed the threshold, routine 500 proceeds to step 560.

The threshold may be a static metric determined before the system performs the data storage operations, or may dynamically change based on the performance of the data storage operations. For example, the data storage operations may perform at a certain capacity or speed which can alter an estimated time of completion. The system may then use this information to determine if the encryption processes will effect the estimated time adversely.

In step 560, the system determines what data, if any, can be stored without encryption. For example, the system may review the types of the data and select a subset of the data that does not need security. In step 570, the system stores the non-encrypted data. At this time, the routine 500 may then proceed back to step 530 and calculate the time remaining to perform the remaining data storage operations, or may proceed to step 580 and encrypt the data using other resources not occupied or associated with the data storage operations.

The information used to instruct the system when and where to encrypt data to be contained within a secondary copy may come from storage window requirements, such as those described herein. That is, the system may choose to use some network resources when selecting where to encrypt when the resources are capable of encrypting the data for the secondary copy and completing data storage operations within the storage window. The system may also look to other system information, such as resource performance information, data storage operation information, resource failure or restoration information, and so on.

In some cases, a data storage system may employ a dedicated media agent to create encrypted secondary copies. The dedicated media agent may be located outside the system network (or, utilize other processing resources). The media agent may receive data from one or more media agents and create additional secondary copies of data in encrypted form. That is, the system may send all secondary copies to be encrypted to the encryption media agent, and encrypt all secondary copies using the encryption media agent. The encryption media agent may then create a single index of all created copies, and store this index with the network. The index may include information about the data stored (such as metadata, characteristics, data types, and so on), the encryption scheme used, the location of the copy of the data, and so on.

Re-Encryption of Previously Stored Data

The system may also facilitate the re-encryption of data previously stored and/or encrypted, such as data not originally or currently under management by the system. For example, the system may receive data from off-site storage locations, such as archive storage locations. As discussed herein, the system may perform some or all processes outside of a data storage system, utilizing resources that do not affect the resources of the data storage system. Therefore, it may be advantageous, in some cases, to use these resources to re-encrypt previously stored data in order to update their encryption schemes, because doing so may update and/or optimize the storage and encryption of new data under management by the system without disrupting or utilizing resources used in data storage operations, among other benefits.

Figure 6:
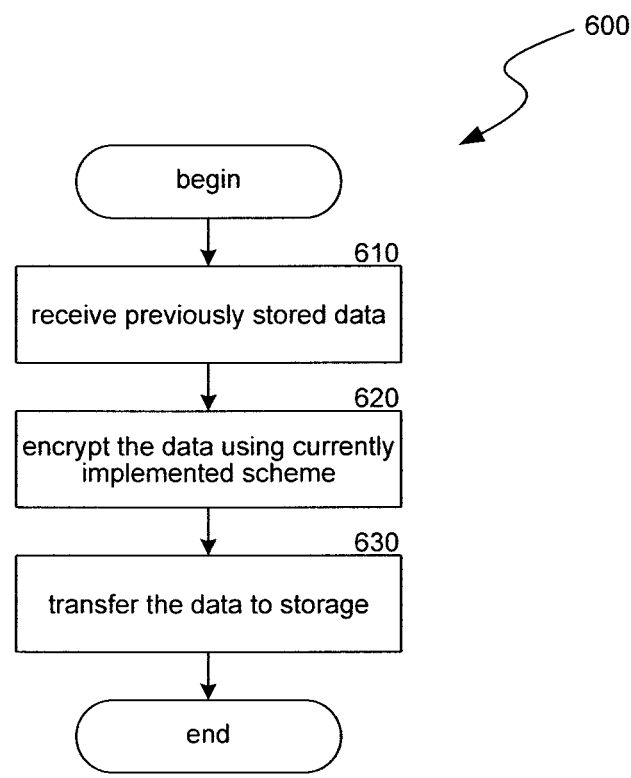
FIG. 6 is a flow diagram illustrating a routine for re-encrypting previously stored data.

FIG. 6 illustrates a routine 600 for re-encrypting previously stored data. In step 610, the system receives data previously stored or archived, such as encrypted data from a media component stored off-site from a data storage system. The data may be encrypted with an outdated encryption scheme, or may be unencrypted. Should the data be encrypted, the system may decrypt the data to access the data and remove the security. In step 620, routine 600 encrypts (or, re-encrypts) the data using an updated or currently implemented encryption scheme. In step 630, routine 600 transfers the re-encrypted data to the media component (or, to a different media component). Thus, the system is able to perform re-encryption of archived or otherwise stored data, enabling a data storage system to constantly update the encryption of stored data with the latest implementations.

In some cases, the system may initiate re-encryption or may do so when a media component is recalled to a media library, as part of a pre-determined rule or policy, such as in review of an associated encryption scheme. The system may import a media component to the library for a restore operation, determine that the media component contains a previous version of an encryption scheme, decrypt the media component, retrieve the data from the media component, perform the restoration, encrypt the previously stored data and the newly stored data with an updated scheme, and store the retrieved data and the additional data on the media component under the updated encryption scheme.

In some cases the system may identify certain data or data types stored on a recalled media component that satisfy a pre-determined criteria, may determine if any data objects that satisfy the criteria are not encrypted or otherwise non-compliant with current or preferred encryption schemes, and may then update the non-compliant and non-encrypted data objects with the preferred encryption scheme. For example, the system may associate certain data types with certain encryption schemes, or may group data into certain data classes, and associated the encryption schemes with the classes of data. The system may create and or utilize an index that relates data classes with encryption schemes, and use this index to identify encryption schemes for data under management. Further details with respect to the classification of data and storage management functions that utilize the data classification may be found in U.S. patent application Ser. No. 11/564,119, filed on Nov. 28, 2006, entitled SYSTEMS AND METHODS FOR CLASSIFYING AND TRANSFERRING INFORMATION IN A STORAGE NETWORK, which is incorporated by reference in its entirety.

Additionally, the system may track and/or monitor encryption schemes currently or previously used when storing data, and periodically recall and re-encrypt copies of the data when encryption schemes improve or are updated. For example, a media component may contain a secondary copy encrypted with a first encryption scheme. The system may create an index or other data structure to track the encryption used for the secondary copy. Two years later (or any other time period after the initial encryption), the system may receive an indication that a new encryption scheme is being used to encrypt similar types of classes of data stored in the secondary copy and encrypted with the first encryption scheme. Using the index that tracks the encryption scheme, the system may then identify the secondary copy as not being encrypted with a preferred encryption scheme, and may recall the secondary copy to the data storage system. The data storage system can then re-encrypt the secondary copy with the preferred encryption scheme, update the index tracking the encryption, and transfer the secondary copy, encrypted with the new encryption scheme, back to secondary storage.

Conclusion

The system may perform some or all of the above examples in combination with one another. For example, the system may use aspects of encryption and resource management to choose a resource for encryption, and may transfer the encryption from one component to another. The system may trigger dynamic encryption processes based on a review of the storage window.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the technology can be practiced with other communications, data processing, or computer system configurations, including: Internet appliances, hand-held devices (including personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the technology can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via any other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the technology can be modified, if necessary, to employ the systems, functions, and concepts of the various references described above to provide yet further examples of the technology.

These and other changes can be made to the technology in light of the above Detailed Description. While the above description describes certain embodiments of the technology, and describes the best mode contemplated, no matter how detailed the above appears in text, the technology can be practiced in many ways. Details of the system and method for classifying and transferring information may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the above Detailed Description section explicitly defines such terms. Accordingly, the actual scope of the technology encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while some aspects of the technology are recited as a system, other aspects may likewise be embodied as a system. Accordingly, the inventors reserve the right to add additional claims after filing the application to pursue such additional claim forms for other aspects of the technology.

From the foregoing, it will be appreciated that specific embodiments of the technology have been described herein for purposes of illustration, but that various modifications may be made without deviating from the spirit and scope of the technology. Accordingly, the technology is not limited except as by the appended claims.

We claim:

1. A system for re-encrypting data stored as secondary copies on secondary storage media under a first encryption scheme, comprising:
    a first storage processor comprising computer hardware having one or more computer processors, first storage processor configured to monitor primary data created by different software applications in a primary data production network, the primary data stored in primary storage within the primary data production network, the primary data further comprising data types associated with the native formats of the different software applications executing within the primary data production network;
    a storage manager that is in communication with the primary data production network, the storage manager configured to direct the first storage processor to create at least a first copy of the primary data based on at least one backup storage policy, wherein the first copy of the primary data is stored in an unencrypted format;
    an encryption tracking component executing on computer hardware comprising one or more computer processors, wherein the encryption tracking component is located remotely from the primary data production network, the encryption tracking component configured to:
        selectively encrypt portions of the first copy of the primary data based on the types of data in the first copy of the primary data to create a secondary copy of the primary data on one or more secondary storage devices, the secondary copy having encrypted portions and unencrypted portions; and
        maintain an index that identifies the unencrypted and encrypted portions of the secondary copy; and
    a media retrieval component executing on the one or more computer processors, wherein the media retrieval component receives an indication from the encryption tracking component to change an encryption scheme for the secondary copy and retrieves at least the encrypted portions of the secondary copy associated with a first encryption scheme; and
    an encryption component executing on the one or more computer processors, wherein the encryption component decrypts the encrypted portions of the secondary copy associated with the first encryption scheme and encrypts the decrypted portions of the secondary copy with a second encryption scheme, wherein the second encryption scheme was created after the secondary copy was stored on the one or more secondary storage devices, and wherein the unencrypted portions of the secondary copy remain unencrypted.

2. The system of claim 1, wherein the encryption tracking component monitors encryption schemes associated with classes of data stored as secondary copies of data.

3. A method of re-encrypting data stored as secondary copies on secondary storage media under a first encryption scheme, comprising:
    monitoring primary data created by different software applications in a primary data production network, the primary data stored in primary storage within the primary data production network, the primary data further comprising data types associated with the native formats of the different software applications executing within the primary data production network;
    creating with a storage manager that is in communication with the primary data production network, at least a first copy of the primary data based on at least one backup storage policy, wherein the first copy of the primary data is stored in an unencrypted format;
    selectively encrypting portions of the first copy of the primary data with an encryption component that is located remotely from the primary data production network, wherein the selectively encrypting is based on the types of data in the first copy of the primary data to create a secondary copy of the primary data on one or more secondary storage devices, the secondary copy having encrypted portions and unencrypted portions;
    maintaining an index that identifies the unencrypted and encrypted portions of the secondary copy;
    receiving an indication to change an encryption scheme for the encrypted portions of the secondary copy;
    decrypting, with one or more computer processors, the encrypted portions of the secondary copy of data associated with a first encryption scheme; and
    encrypting the decrypted portions of the secondary copy with a second encryption scheme, wherein the second encryption scheme was created after the secondary copy was stored on the one or more secondary storage devices, and wherein the unencrypted portions of the secondary copy remain unencrypted.

4. The method of claim 3, wherein said monitoring comprises monitoring encryption schemes associated with classes of data stored as secondary copies of data.

* * * * *